Dec. 7, 1965 C. W. NORTON, JR 3,222,611
DISTRIBUTED AMPLIFIER
Filed March 1, 1962
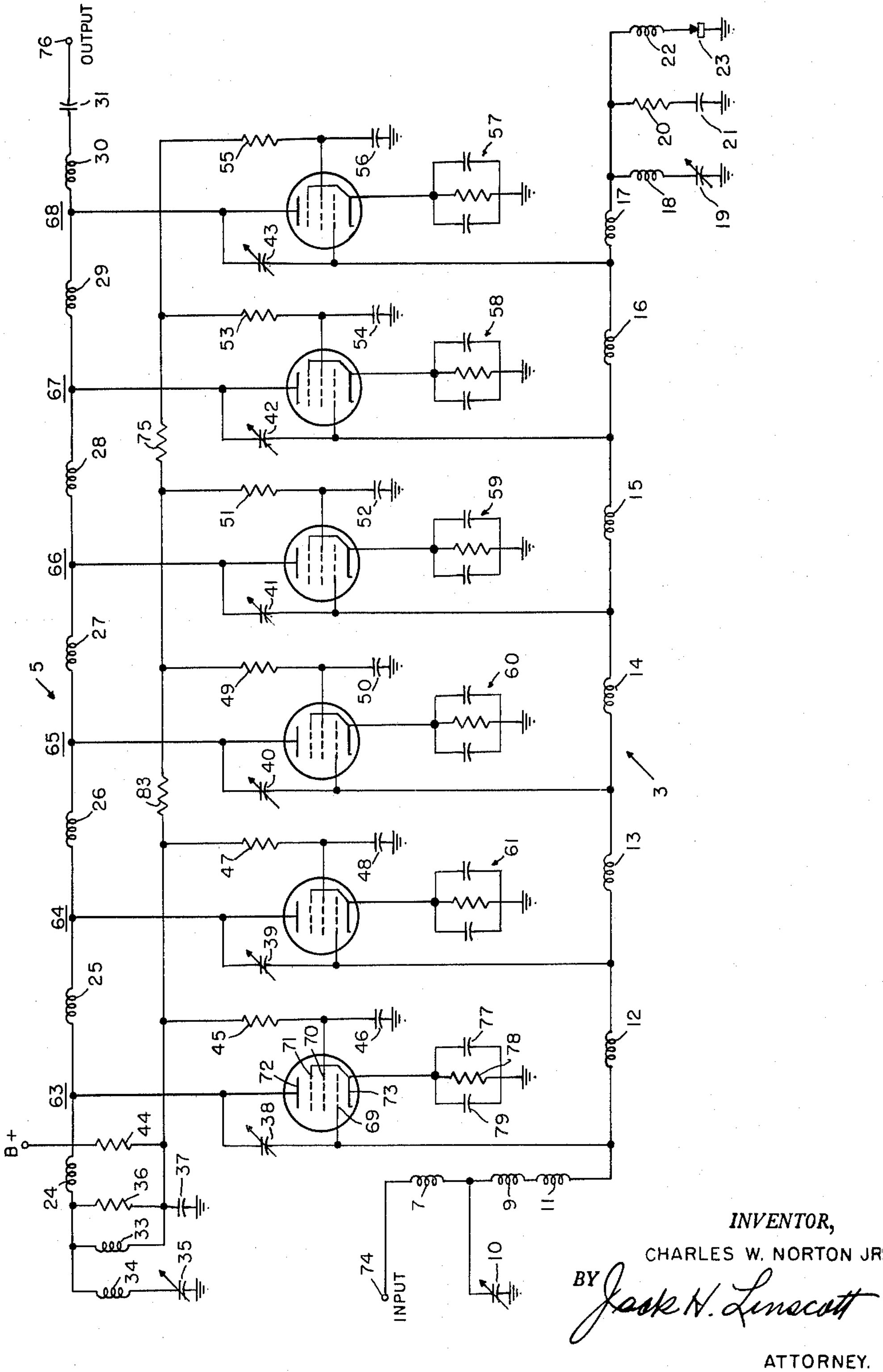
INVENTOR,
CHARLES W. NORTON JR.
BY Jack H. Linscott
ATTORNEY.

United States Patent Office 3,222,611

Patented Dec. 7, 1965

3,222,611

DISTRIBUTED AMPLIFIER

Charles W. Norton, Jr., Belmar, N.J., assignor to the United States of America as represented by the Secretary of the Army Filed Mar. 1, 1962, Ser. No. 176,833
6 Claims. (Cl. 330—54)
(Granted under Title 35, U.S. Code (1952), sec. 266)

The invention described herein may be manufactured and used by or for the Government for governmental purposes without the payment of any royalty thereon.

The present invention relates to a novel and useful amplifier and more particularly to an amplifier of the distributed type.

In conventional amplifiers the high frequency response, and hence the bandwidth, is limited by the shunting effect of tube and wiring capacity. Bandwidth can be increased by decreasing the gain of each stage, however this expedient becomes useless when the stage gain is reduced to unity or below. Further, since the overall gain of a number of cascaded stages is the product of the gains of the individual stages, the bandwidth of such a multi-stage amplifier will necessarily be less than the bandwidth of any of the individual stages. It can be shown that the upper half power frequency of a cascaded amplifier varies approximately inversely with the square root of the number of stages. The simple paralleling of high impedance amplifying elements results in an overall gain equal to the sum of the individual gains, however the shunting capacities of all stages are also added, with the result that no increase in bandwidth results compared to that of a single stage. The distributed amplifier overcomes these limitations by paralleling the amplifying elements in such a way that the outputs thereof are additive but the shunt capacities are effectively separated. This may be accomplished, for example, by connecting the inputs of the tubes, or other amplifying elements, to spaced points on a first artificial transmission line, called the grid or input line, the amplifier outputs being connected to equally spaced points on a second artificial transmission line, called the plate or output line. Both lines are composed of a series of lumped inductors and shunt capacity which may consist in whole or in part of the input and output capacity of the tubes. If the grid, or input line is terminated in its characteristic impedance and the line is assumed to be lossless, the input impedance of the line will be independent of the number of tubes connected thereto. An input signal connected to the grid line will travel down the line, energizing each tube in sequence and then will be absorbed in the grid line termination. The end of the plate line nearest to the first tube is terminated with the characteristic impedance of this line, and is known as the reverse termination. The other end of plate line is the output termination and may be connected to a utilization device or to another cascaded distributed amplifier. Each tube or amplifying element is known as a section, the entire amplifier is known as a stage. The sequential outputs of each section launch waves in the plate line in both directions. Those traveling toward the reverse termination are absorbed therein and do not contribute to the output. The waves from each section traveling toward the output termination all arrive at the output at the same time and therefore add in phase, to provide a gain equal the sum of the section gains. In order to accomplish inphase addition, the velocity of propagation in each line must be made the same, however, the lines may have different impedances. By the use of these techniques, bandwidths of hundreds of megacycles can be readily attained.

The present invention comprises a novel distributed amplifier which is stabilized against undesired parasitic oscillations by simple and effective means.

It is, therefore, an object of this invention to provide a distributed amplifier of improved performance.

It is a further object of this invention to provide novel means for preventing tube burnout in a distributed amplifier.

The invention may take the form illustrated in the sole figure of the drawing. Shown therein is a single stage, six-section distributed amplifier constructed according to the invention. Each of the sections 63–68 comprises a pentode tube and associated circuitry. The control grids of the pentodes are connected to spaced points on the grid artificial transmission line 3, the plates or anodes of the pentodes being tied into similarly spaced points on plate artificial transmission line 5. The grid line 3 comprises series inductors 11 through 17, the shunt capacity for the line being provided by the input capacity of the tubes, plus stray wiring capacity. Similarly, plate line 5 is composed of series inductors 24 through 30, shunted by the inter-electrode and stray wiring capacity associated with the pentode plates. Input signals are applied to terminal 74. The LC network 7, 9, and 10 comprises an impedance transformer for matching the impedance of the grid line to that of the signal source, which may, for example, be the higher impedance plate line of a preceding stage. The grid line termination consists of resistor 20, which is chosen to equal the characteristic impedance of the grid line. The by-pass capacitor 21 effectively grounds the lower end of 20 for A.C. but isolates the line from ground D.C.-wise. The series resonant circuit 18 and 19 is adjusted to resonate about 20% above the cutoff frequency of the line. This circuit has been found to be effective in maintaining a smooth impedance match between the line and its termination over a wide frequency range. RF choke 22 and diode 23 comprise an overload or clamping circuit which prevents the grid line from rising above zero voltage, D.C.-wise. If one of the pentodes should develop a grid-to-cathode short, the positive cathode bias voltage from the defective section would be fed to all other sections via the grid line, thus hastening tube burnout. The overload circuit prevents this by shorting any positive D.C. voltage on the grid line to ground. The reverse termination of the plate line comprises resistor 36, the lower end of which is by-passed to ground via capacitor 37. Series resonant network 34 and 35 serves a purpose the same as 18 and 19 in the grid line. The output appears at the right hand end of the plate line, at terminal 76.

The circuitry of each section of this distributed amplifier is the same and hence only the first or section 63 will be described in detail. The pentode is of the type in which the suppressor grid 71 is internally tied to the cathode 73. The cathode 73 is connected to ground via a self-biasing network comprising a resistor 78 and two paralleled by-pass capacitors 77 and 79. It has been found that the use of two by-pass capacitors in parallel reduces the cathode lead inductance, which is a source of instability at high frequencies. The plate 72 is connected to B+ through inductor 24, which forms part of the plate line, RF choke 33 and resistor 44. Resistor 45 and capacitor 46 comprise the screen grid dropping resistor and filter capacitor, respectively. Resistors 44, 83 and 75 are parasitic suppressors of small ohmic value. The negative side of the B+ plate voltage supply is grounded to provide a point of reference potential.

An important feature of the instant circuit is the inclusion of the feedback stabilizing capacitors, 38 through 43, connected between plate and control grid of each pentode. These are small variable capacitors, having a maximum capacity of the same order of magnitude as the pentode inter-electrode capacity. These capacitors feed back a small portion of the output voltage of each section in such a phase as to prevent high frequency parasitic oscillation. These high frequency parasitic oscillations occur at frequencies at which cathode lead inductance becomes appreciable. At such frequencies the plate to suppressor inter-electrode capacity appears in series with the cathode-grid inter-electrode capacity with the cathode lead inductance providing a mid-point shunt to ground. This network provides positive feedback from plate to grid and can result in high frequency oscillation or instability. The feedback introduced by the capacitors 38 through 43 is negative and therefore tends to nullify the effect of the undesired positive feedback. In practice, capacitors 38–43 are made variable and are individually adjusted for optimum performance under actual operating conditions. In this way tube-to-tube variations can be compensated for.

Illustrative values for components in the drawing are as follows:

| | | |
|---|---|---|
| Tubes | | 6AK5 |
| 45 | ohms | 5600 |
| 78 | do | 270 |
| 83, 75, and 44 each | do | 10 |
| 36 | do | 220 |
| 20 | do | 150 |
| 46 | μμfd | 680 |
| 77 and 79 | μμfd | 1000 |
| 19 | μμfd | 3 |
| 35 | μμfd | 2 |
| 23 | diode | 1N645 |
| 25–29 | μh | .18 |
| 12–17 | μh | .10 |
| 7 | μh | .12 |
| 9 | μh | .06 |
| 33 | μh | 2.2 |
| 22 | μh | 2.2 |
| 34 | μh | .12 |
| 18 | μh | .06 |

While a specific embodiment of the invention has been illustrated and described, it should be understood that the invention should be limited only by scope of the appended claims.

What is claimed is:

1. In a distributed amplifier of the type in which a plurality of tubes are arranged with their control grids connected to spaced points along a first transmission line, said transmission line comprising a series of inductors with an input terminal at one end of said series of inductors and a reflectionless termination connected from the other end of said series of inductors to a point of reference potential and with the plate circuits of said tubes connected to spaced points along a second transmission line and in which each tube is provided with cathode self-bias; the improvement comprising, means connected between said series of inductors and said point of reference potential to prevent the direct current voltage along said series of inductors from becoming poistive with respect to said point of reference potential, whereby a grid-to-cathode short of any said tubes will not result in the burnout of any of the other of said tubes.

2. The circuit of claim 1 in which said means comprises a diode and a choke connected in series from said series of inductors to said point of reference potential.

3. The circuit of claim 1 in which said means comprises a diode and a choke connected in series from said series of inductors to said point of reference potential, the polarity of said diode being such that the cathode thereof is connected toward said point of reference potential.

4. A distributed amplifier comprising, a first transmission line comprising a first series of inductors with an input terminal on one end of said series and a reflectionless termination connected from the other end of said first series to a point of reference potential, a plurality of vacuum tubes with their control grids connected to spaced points along said first transmission line and their plate circuits connected to spaced points along a second transmission line, said second transmission line comprising a second series of inductors with an output terminal at one end of said second series of inductors and a reflectionless termination connected from the other end of said second series of inductors to said point of reference potential, a parallel resistor-capacitor network connected between the cathode of each of said vacuum tubes and said point of reference potential, and a choke and diode connected in series from said first transmission line of said point of reference potential, said diode being connected in such a direction as to short any positive direct current voltage on said first transmission line to said point of reference potential.

5. In a distributed amplifier of the type in which a plurality of tubes are arranged with their control grids connected to spaced points along a first transmission line, said transmission line comprising a series of inductors with an input terminal at one end of said series of inductors and a reflectionless termination connected from the other end of said series of inductors to a point of reference potential and with the plate circuits of said tubes connected to spaced points along a second transmission line and in which each tube is provided with cathode self-bias; the improvements comprising, means to prevent the direct current voltage along said series of inductors from becoming positive with respect to said point of reference potential and a variable feedback stabilizing capacitor connected between the control grid and plate of each of said tubes, the maximum capacity of said capacitors being of the same order of magnitude as said tube inter-electrode capacity.

6. A distributed amplifier comprising a first transmission line, a plurality of amplifying sections with their input connected to spaced points on said first transmission line and their outputs connected to spaced points along a second transmission line, an input terminal at one end of said first transmission line and a reflectionless termination connected from the other end of said first transmission line to a point of reference potential, an output terminal at one end of said second transmission line and a reflectionless terminal at the other end thereof, means connected from said first transmission line to said point of reference potential to prevent positive direct voltage from appearing on said first transmission line, and a variable feedback stabilizing capacitor connected between said inputs and outputs of each of said amplifying sections.

References Cited by the Examiner

UNITED STATES PATENTS

| | | | |
|---|---|---|---|
| 2,670,408 | 2/1954 | Kelley | 330—54 |
| 2,759,051 | 8/1956 | Lockwood et al. | 330—54 X |
| 2,815,406 | 12/1957 | Tongue | 330—54 |
| 2,863,006 | 12/1958 | Diambra et al. | 330—54 |

FOREIGN PATENTS

| | | |
|---|---|---|
| 842,085 | 7/1960 | Great Britain. |

ROY LAKE, *Primary Examiner.*

NATHAN KAUFMAN, *Examiner.*